2,479,555

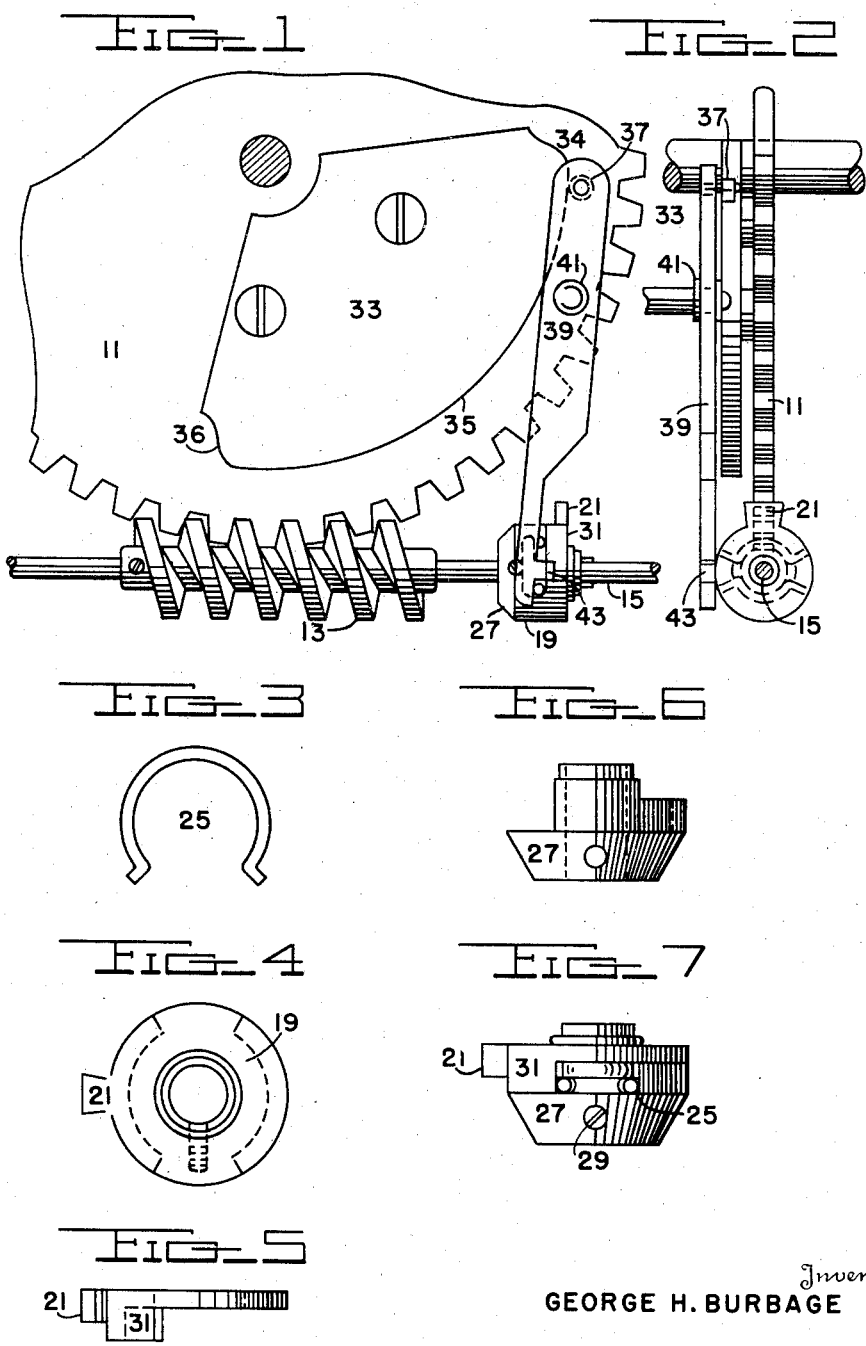
Aug. 23, 1949.  G. H. BURBAGE  2,479,555
TUNING DRIVE MECHANISM FOR SUPERFREQUENCY RECEIVERS
Filed July 27, 1944
Inventor
GEORGE H. BURBAGE Patented Aug. 23, 1949

UNITED STATES PATENT OFFICE 2,479,555

TUNING DRIVE MECHANISM FOR SUPERFREQUENCY RECEIVERS

George H. Burbage, Washington, D. C.

Application July 27, 1944, Serial No. 546,898

3 Claims. (Cl. 192—139)

(Granted under the act of March 3, 1883, as amended April 30, 1928; 370 O. G. 757)

This invention relates to limiting stops for use with hand operated gear driven devices. More particularly it relates to an arrangement for preventing shock upon the driven device or strain upon the intermediate gearing when the driven member arrives at its limiting position.

For the purpose of permitting micrometer control of the tuning elements of a radio apparatus, it is the custom to operate these elements by means of a chain of intermediate gearing so that a considerable rotation of the hand operated means will give a much smaller rotation of the driven device. Since the finally driven member may turn only a part of a revolution, whereas the driving member makes many revolutions, the limiting stops must operate as a function of the driven means. It has been the practice to apply the limit stops to the driven member in an obvious manner and this results in the elements arriving at the limiting position with a considerable shock. This latter tends to destroy the accurate adjustment of the adjustable element throughout its range and to produce unnecessary strain on and wear of the intermediate gearing. Also the shock of the sudden stopping of the entire mass of the driven element and the connecting gearing tends to throw other elements of the device out of adjustment.

It is the principal object of this invention to provide means for limiting the motion of an element of a radio device without such shocks as ordinarily attend the use of positive stops.

It is a further object of this invention to stop the tuning of a radio element without straining the intermediate gearing.

A still further object of this invention is to provide a stop of this type which shall be operative to stop rotation at both limits of its operation.

It is an ancillary object of this invention to provide means of the type described which may be installed readily in existing equipment without requiring extensive rearrangements of the various elements of the existing device.

These and other objects will become more apparent from the following specification taken in connection with the accompanying drawings.

In accomplishing the objects of this invention a cam on the driven member, at either limit of motion of the driven member, moves a stop member into the path of a dog which is resiliently mounted on and rotates with the hand operated driving member. This causes the latter to come to a snubbed stop in a fraction of a turn and thus stops the driven member and the intermediate gearing without shock, consequently accomplishing the objects of the invention.

Having thus briefly described the invention, attention is invited to the accompanying drawings in which Fig. 1 is a partial schematic drawing showing the invention.

Fig. 2 is an end view of the device as shown in Fig. 1;

Fig. 3 is a view of a spring for use in the snubber shown in Figs. 4 and 7;

Fig. 4 is a plan view of a snubber constituting part of this invention; Figs. 5 and 6 are elevations showing component parts of the snubber shown in Figs. 4 and 7; and, Fig. 7 is an assembly view of the elements shown in Figs. 5 and 6.

Attention is now particularly invited to Figs. 1 and 2 of the drawings which show the invention.

In these figures a worm gear 11 is driven by the worm 13 secured to the hand operated shaft 15. A cam 33 is mounted, spaced from the worm gear 11 as shown, and is so cut as to present a cam surface 35 to the roller 37, of the stop arm 39. The stop arm 39 is pivoted at 41 and has a stop projection 43 which will, when the gear 11 turns so that either surface 34 or 36 is presented to the cam roller 37, engage the dog 21 of the snubber 19 the next time the shaft 15 is tuned to the right position. The snubber 19 has space for two springs 25 between the parts 27 and 31. By this means the part 31 is resiliently coupled to part 27 for rotation in either direction, so that regardless of which way shaft 15 is being turned, it will be brought to a cushioned stop when the stop projection 43 engages the dog 21.

The action of the snubber 19 will be more apparent upon consideration of Figs. 3, 4, 5, 6, and 7, to which attention is now invited. The snubber is composed of two main elements, element 27 being keyed or secured as shown or otherwise secured to the shaft 15, and the relatively movable element 31 whose disc shaped portion is rotatably mounted on the reduced cylindrical portion of the element 27.

Two springs 25 are enclosed in the annular space between parts 31 and 27, one to maintain the spaced relationship between the parts on each side thereof.

This arrangement operates as follows: Assuming that the shaft 15 is being turned in the counter-clockwise direction looking from the right end thereof as shown in Figure 2, the gear 11 as shown in the figure will be rotated in a clockwise direction. When 11 has rotated a sufficient distance, the roller 37 will go off of surface 35 onto surface 34 throwing projection 43 into the path of dog 21. When 21 and 43 contact, the element 31 will be held stationary and further rotation of 15 will be against the spring pressure of one of the springs 25. Thus the shaft 15 and gear 11 will be brought to a cushioned stop.

An exactly similar action is obtained when the drive shaft 15 is tuned in the opposite or clockwise direction and the roller 37 goes off the surface 35 onto the surface 36. Then the projection 43 will be moved into the path of dog 21 and will, through the snubber, bring the shaft to a cushioned stop.

It is apparent that various modifications may be made in the devices shown and described for the purposes of illustration and that this invention is not limited to the specific devices shown but rather to the actual scope of the invention as defined in the following claims.

The invention described herein may be manufactured and used by or for the Government of the United States of America for governmental purposes without the payment of any royalties thereon or therefor.

I claim:

1. Apparatus for driving a movable device between fixed limits comprising a driving shaft permanently geared to the movable device coupling means fixed on said driving means, means mounted for rotation about the driving shaft, resilient means limiting the relative movement between said coupling means and said rotatably mounted means in either rotational direction, and movable stop means supported independently of any of said foregoing means and movable by said movable device upon movement of the latter to one of said fixed limits to block movement of said rotatably mounted means.

2. Apparatus for driving a movable device between fixed limits comprising a driving shaft, coupling means surrounding and fixed on said shaft for rotation therewith, means rotatably mounted on said coupling means, resilient means tending to effect limited relative rotation between said coupling means and said rotatably mounted means in one direction, a second resilient means tending to effect limited relative rotation between said coupling means and said rotatably mounted means in an opposite direction, positive stop means for said rotatably mounted means movable to block movement of the rotatably mounted means upon movement of the movable device to one of its fixed limits.

3. A snubber for stopping a driven device at opposite limits comprising a first element mounted on a driving shaft for said device, said element including a central core portion, a disc portion attached to one end of said core, a bore through said core for the reception of said shaft, a set screw operable to secure said element to said shaft, and a substantially semicircular flange portion spaced from said core, a second disc-shaped element having a hole therethrough to fit the core portion of said first element, a substantially semicircular flange portion on the side of said second element toward said first element whereby there is defined between the two elements an annular space, a dog on said second element, two horseshoe shaped springs in the annular space thus provided, so arranged that the ends of each of said flanges are normally held separated by said springs, and a stop element movable into the path of the dog upon movement of the movable device to either one of its limits, whereby when said driven device reaches a limit of its operation and the stop is moved into the path of the dog, continued operation of the shaft will be opposed by the increasing pressure of one of said springs as the dog is held stationary by the stop.

GEORGE H. BURBAGE.

REFERENCES CITED

The following references are of record in the file of this patent:

UNITED STATES PATENTS

| Number | Name | Date |
|---|---|---|
| 701,872 | Giacomini | June 10, 1902 |
| 1,648,554 | Lundin et al. | Nov. 8, 1927 |
| 1,712,901 | Paris | May 14, 1929 |
| 1,810,317 | Lasker | June 16, 1931 |
| 1,850,260 | Daly | Mar. 22, 1932 |
| 1,964,081 | Rausch | June 26, 1934 |
| 2,091,570 | Ritzerfeld | Aug. 31, 1937 |
| 2,167,474 | Chudner | July 25, 1939 |
| 2,182,733 | Minkow | Dec. 5, 1939 |
| 2,309,152 | Woodruff et al. | Jan. 26, 1943 |